(12) United States Patent
Gehman

(45) Date of Patent: Jun. 5, 2001
(10) Patent No.: US 6,241,450 B1

(54) LOAD SUPPORTING ASSEMBLY FOR A TRAILER HAVING FRONT AND REAR PIVOTAL PLATFORM SECTIONS MOVABLY INTERCONNECTED BY DUAL ACTUATION LINKAGES

(75) Inventor: Roland P. Gehman, Stevens, PA (US)

(73) Assignee: MGS, Inc., Denver, PA (US)

( * ) Notice: Subject to any disclaimer, the term of this patent is extended or adjusted under 35 U.S.C. 154(b) by 0 days.

(21) Appl. No.: 09/427,122

(22) Filed: Oct. 23, 1999

(51) Int. Cl.$^7$ .................................................. B65G 67/02
(52) U.S. Cl. .......................... 414/480; 414/469; 414/482; 414/537
(58) Field of Search .................................. 414/480, 537, 414/482, 469

(56) References Cited

U.S. PATENT DOCUMENTS

| | | | |
|---|---|---|---|
| 3,690,490 | 9/1972 | Hall | 214/506 |
| 3,720,335 | 3/1973 | Ward | 214/505 |
| 3,720,336 * | 3/1973 | Murray et al. | 414/482 X |
| 3,968,892 | 7/1976 | Spors | 214/505 |
| 3,972,428 | 8/1976 | Love, Jr. et al. | 214/85 |
| 4,197,048 | 4/1980 | Brill | 414/480 |
| 4,607,996 | 8/1986 | Koch | 414/537 |
| 4,792,274 | 12/1988 | Cockram | 414/437 |
| 4,813,841 | 3/1989 | Eischen | 414/477 |
| 4,902,188 | 2/1990 | Page | 414/495 |
| 5,051,053 | 9/1991 | Groeneweg | 414/483 |
| 5,234,308 * | 8/1993 | Mann | 414/480 |
| 5,328,320 | 7/1994 | Farrow et al. | 414/495 |

* cited by examiner

Primary Examiner—Steven A. Bratlie
(74) Attorney, Agent, or Firm—Michael R. Swartz; Jack R Flanagan

(57) ABSTRACT

A load supporting assembly for a trailer includes an elongated frame, a platform subassembly having a middle fixed platform section, a pair of front and rear pivotal platform sections being pivotally mounted to the middle fixed platform section and a pair of linkages movably interconnecting the front and rear pivotal platform sections such that the front and rear pivotal platform sections can pivot independently of and automatically relative to one another and to the middle fixed platform section and the frame without the need for any substantial operator intervention and in response to an operator driving a vehicle onto or from the platform assembly. The vehicle in being loaded onto the platform subassembly can push the front pivotal platform section down from the respective raised to lower position thereof without any corresponding movement of the rear pivotal platform section. The vehicle in being unloaded from the platform subassembly can push the rear pivotal platform section down from the respective raised to lower position thereof without any corresponding movement of the front pivotal platform section.

25 Claims, 5 Drawing Sheets

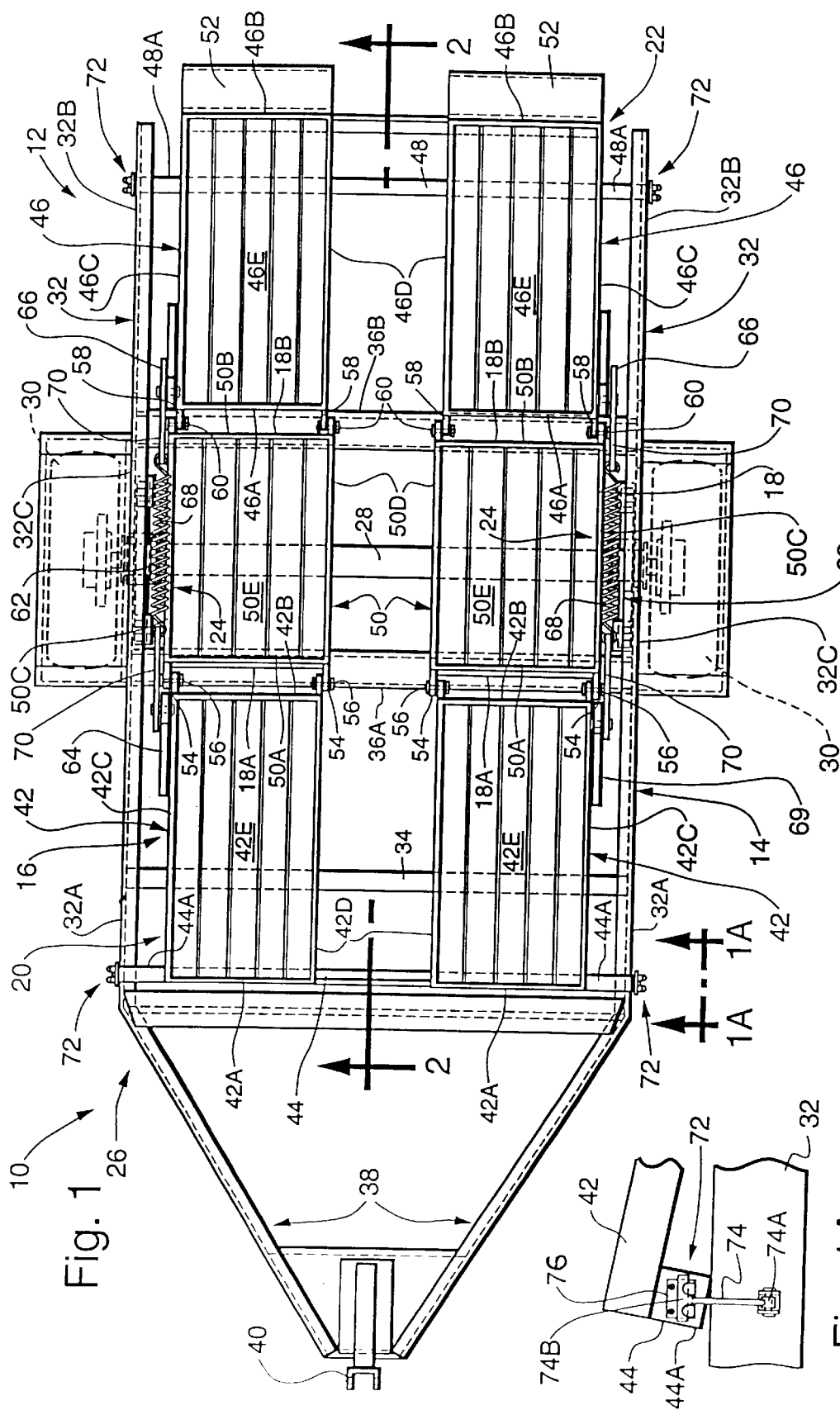

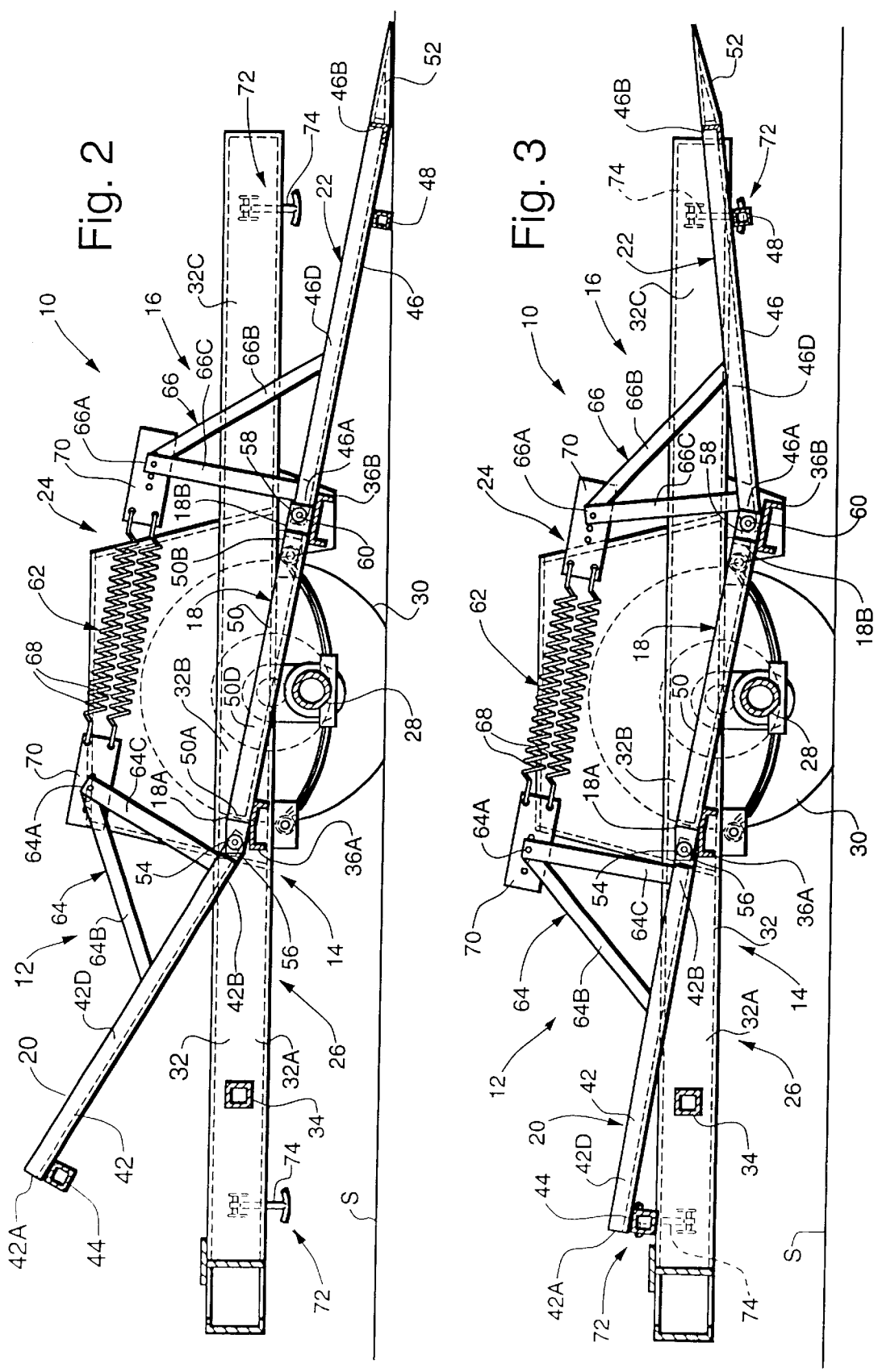

LOAD SUPPORTING ASSEMBLY FOR A TRAILER HAVING FRONT AND REAR PIVOTAL PLATFORM SECTIONS MOVABLY INTERCONNECTED BY DUAL ACTUATION LINKAGES

BACKGROUND OF THE INVENTION

1. Field of the Invention

The present invention generally relates to platforms for utility trailers and, more particularly, is concerned with a load supporting assembly for a trailer having front and rear pivotal platform sections interconnected by dual actuation linkages and independently pivotable relative to one another and to a middle fixed platform section.

2. Description of the Prior Art

Utility trailers for towing behind vehicles are often used to transport other vehicles, such as tractors, from place to place. A typical utility trailer has an elongated horizontal platform for supporting the vehicle being transported. In the basic utility trailer design, portable ramps are stored and carried on the platform with the vehicle and then temporarily placed at the rear end of the trailer platform for loading and unloading the vehicle onto and from the platform. The problem here is that considerable manual effort is required of the operator to move the portable ramps between their stored and employed positions.

In other trailer designs, the platform itself or at least a pivotal rear ramp portion thereof is movable between inclined and horizontal orientations relative to the ground to avoid the necessity providing and manually moving portable ramps. The platform or ramp portion thereof is placed in the inclined orientation when loading and unloading the vehicle and in the horizontal orientation or in a vertical orientation when transporting the vehicle. A variety of trailers with platforms having pivotal ramps have been proposed over the years for loading, unloading and transporting vehicles on utility trailers. Representative examples of such prior art trailers and the like are disclosed in U.S. Pat. No. 3,690,490 to Hall, U.S. Pat. No. 3,720,335 to Ward, U.S. Pat. No. 3,968,892 to Spors, U.S. Pat. No. 3,972,428 to Love, Jr. et al., U.S. Pat. No. 4,197,048 to Brill, U.S. Pat. No. 4,607,996 to Koch, U.S. Pat. No. 4,813,841 to Eischen, U.S. Pat. No. 4,902,188 to Page, U.S. Pat. No. 5,051,053 to Groeneweg and U.S. Pat. No. 5,328,320 to Farrow et al. However, in the case of most of these designs, considerable manual effort is still required on the part of the operator to move the pivotal ramp portions of these trailer platforms between their employed unloading/loading positions and storage or transport positions.

In still another trailer design as disclosed in U.S. Pat. No. 4,792,274 to Cockram, the utility trailer has a fixed horizontal middle platform and a pivotal front actuating ramp assembly and rear ramp and tailgate assembly pivotally mounted respectively at front and rear edges of the middle platform which are automatically moved between unloading/loading and transport positions with the requirement of manual effort by the operator. The front actuating ramp assembly and rear ramp and tailgate assembly are automatically operated by the action of a mechanical linkage system interconnecting them so as to pivotally move between an inclined orientation relative to the horizontal middle platform for loading and unloading the vehicle and a coplanar horizontal orientation relative to the middle platform for transporting the vehicle.

However, the mechanical linkage system interconnecting the front actuating ramp assembly and rear ramp and tailgate assembly appears to require that they move together and thus that the fixed middle platform of the trailer have a sufficient minimum length to be capable of temporarily receiving and supporting the vehicle solely upon itself as the vehicle is moved between the front actuating ramp assembly and rear ramp and tailgate assembly during loading and unloading. This minimum length requirement of the middle platform of the Cockram trailer for temporarily supporting the vehicle solely thereon results in the provision of a fixed middle platform of substantial length with the front actuating ramp assembly and rear ramp and tailgate assembly, although each shorter in length than the middle platform, adding significantly to the overall trailer length. Further, in Cockram, the middle section is horizontal when the rear ramp section is inclined during loading and unloading in thereby causing a substantial transition between the middle section and the rear section which prevents the loading and unloading of low-clearance vehicles that require a more-or-less continuous ramp.

Thus, the Cockram trailer appears not to provide an optimum solution to the problem of how to load and unload vehicles on and from utility trailers without requiring exertion of considerable manual effort by an operator in that while the Cockram trailer eliminates the above-cited problem but introduces another significant problem in its place by increasing the overall trailer length in addition to not being suited to the loading and unloading of low clearance vehicles.

Consequently, a need remains for an innovation which will provide a more effective solution for loading, unloading and transporting vehicles on utility trailers without introducing any new problems in the process and one which is particularly suited for loading and unloading of low clearance vehicles.

SUMMARY OF THE INVENTION

The present invention provides a load supporting assembly for a trailer designed to satisfy the aforementioned need. The load supporting assembly of the present invention includes a platform subassembly having front and rear pivotal platform sections pivotally mounted to opposite ends of a middle fixed platform section and movably interconnected dual actuation linkages such that the front and rear pivotal platform sections can automatically pivot between respective raised and lowered positions without the need for any substantial operator intervention other than the operator driving a vehicle to load or unload it onto or from the platform subassembly. The platform subassembly is more versatile than the prior art Cockram platform and is shorter in length and thus likely lower in cost than the prior art Cockram platform and can be used for the loading and unloading of low clearance vehicles.

Accordingly, the present invention is directed to a load supporting assembly which comprises: (a) an elongated frame; (b) a platform subassembly supported by the frame and including (i) a middle fixed platform section mounted to the frame at a fixed orientation and having opposite forward and rearward ends, (ii) a front pivotal platform section having a rear end pivotally mounted adjacent to the forward end of the middle fixed platform section to undergo pivotal movement between raised and lowered positions relative to the middle fixed platform section and the frame, and (iii) a rear pivotal platform section having a front end pivotally mounted adjacent to the rearward end of the middle fixed platform section to undergo movement between raised and lowered positions relative to the middle fixed platform section and the frame; and (c) means for movably interconnecting the front and rear pivotal platform sections such that the front and rear pivotal platform sections can pivot independently of and automatically relative to one another and relative to the middle fixed platform section and the frame in response to an operator driving a vehicle onto or from the platform assembly wherein the vehicle in being loaded onto the platform subassembly can push the front pivotal platform section down from the respective raised to lower position thereof without any corresponding movement of the rear pivotal platform section and the vehicle in being unloaded from the platform subassembly can push the rear pivotal platform section down from the respective raised to lower position thereof without any corresponding movement of the front pivotal platform section.

More particularly, in the illustrative embodiment, the front pivotal platform section includes a pair of longitudinally-extending forward tracks laterally spaced apart from and disposed in substantially parallel relation to one another and a forward cross member extending transversely to and fixedly interconnecting the forward tracks. Each forward track of the front pivotal platform section has a width adapted to receive thereover wheels of the vehicle during loading and unloading of the vehicle onto and from the platform subassembly. The rear pivotal platform section includes a pair of longitudinally-extending rearward tracks laterally spaced apart from and disposed in substantially parallel relation to one another and a rearward cross member extending transversely to and fixedly interconnecting the rearward tracks. Each rearward track of the rear pivotal platform section has a width adapted to receive thereover the wheels of the vehicle during loading and unloading of the vehicle onto and from the platform subassembly. The middle fixed platform section includes a pair of longitudinally-extending middle tracks laterally spaced apart from and disposed in substantially parallel relation to one another and being fixed on the frame in longitudinal alignment with the forward and rearward tracks when viewed from thereabove. Each middle track of the middle fixed platform section has a width adapted to receive thereover the wheels of the vehicle during loading and unloading of the vehicle onto and from the platform subassembly.

The frame includes a pair of laterally spaced apart longitudinal frame members and forward and rearward transverse frame members extending between and rigidly interconnecting the longitudinal frame members and fixedly supporting the middle fixed platform section thereon. The longitudinal frame members each has a height and the transverse frame members are disposed at different elevations between the longitudinal frame members relative to the heights thereof such that the fixed orientation of the middle fixed platform section, in the illustrative embodiment, is at a slight acute angle relative to the longitudinal members of the frame, however, in other applications the middle platform section can be flat relative to the longitudinal members of the frame.

The means for movably interconnecting the front and rear pivotal platform sections is a pair of extendable and contractible linkages each having an elastic member in the form of an extensible and contractible spring having opposite ends and a pair of brace structures each respectively fixedly mounted on one of the front and rear pivotal platform sections. Each of the elastic members extends between and is coupled at the opposite ends thereof to the brace structures of a respective pair thereof for allowing independent pivotal movement of each of the front and rear pivotal platform sections relative to one another and to the middle fixed platform section and frame. The middle fixed platform section has a pair of opposite sides and each of the elastic members extends along and is spaced vertically above one of the opposite sides of the middle fixed platform section, however, in a modified design which is equivalent in operation, each of the elastic members could be spaced vertically below one of the opposite sides of the middle fixed platform section.

The assembly further comprises means for latching each of the front and rear pivotal platform sections to the frame during movement of the load supporting assembly. Each of the front and rear pivotal platform sections has opposite sides disposed adjacent to the frame when the front and rear pivotal platform sections are disposed respectively at their lowered and raised positions. The latching means, in the illustrative embodiment, includes a plurality of bars each having a substantially T-shaped configuration and being pivotally mounted to one of the frame and the front and rear pivotal platform sections, and a plurality of clips each having a substantially U-shaped cross-sectional configuration and being fixedly mounted to the other of the frame and the front and rear pivotal platform sections such that each clip releasably and securely receives one of the bars for latching the front and rear pivotal platform sections to the frame.

The present invention also is directed to a load supporting assembly which comprises: (a) an elongated frame; (b) a platform subassembly supported by the frame and including (i) a middle fixed platform section mounted to the frame at a fixed orientation and having opposite forward and rearward ends spaced apart at a first longitudinal length, (ii) a front pivotal platform section having front and rear ends spaced apart at a second longitudinal length being greater than the first longitudinal length of the middle fixed platform section, the front pivotal platform section being pivotally mounted at the rear end thereof to the forward end of the middle fixed platform section to undergo pivotal movement between raised and lowered positions relative to the middle fixed platform section and the frame, and (iii) a rear pivotal platform section having front and rear ends spaced apart at a third longitudinal length being greater than the first longitudinal length of the middle fixed platform section, the rear pivotal platform section being pivotally mounted at the rear end thereof to the rearward end of the middle fixed platform section to undergo movement between raised and lowered positions relative to the middle fixed platform section and the frame; and (c) means for movably interconnecting the front and rear pivotal platform sections such that the front and rear pivotal platform sections can pivot relative to the middle fixed platform section and the frame due to an operator driving a vehicle onto or from the platform assembly.

The present invention further is directed to a load supporting assembly which comprises: (a) an elongated frame including a pair of laterally spaced apart longitudinally-extending frame members; (b) a platform subassembly supported by said frame and including (i) a middle fixed platform section mounted to said frame at an inclined orientation relative to said longitudinally-extending frame members and having opposite forward and rearward ends with said forward end being disposed at an elevation greater than said lower end, (ii) a front pivotal platform section having front and rear ends, said front pivotal platform section at said rear end thereof being pivotally mounted adjacent to said forward end of said middle fixed platform section to undergo pivotal movement between raised and lowered positions relative to said middle fixed platform section and said frame, and (iii) a rear pivotal platform section having front and rear ends, said rear pivotal platform section at said front end thereof being pivotally mounted adjacent to said rearward end of said middle fixed platform section to undergo movement between raised and lowered positions relative to said middle fixed platform section and said frame, said rear pivotal platform section in said lowered position and said middle fixed platform section together forming an extended continuous ramp at a low angle inclination relative to the ground for facilitating the loading and unloading a vehicle onto and from said platform assembly; and (c) means for movably interconnecting said front and rear pivotal platform sections such that said front and rear pivotal platform sections can pivot relative to said middle fixed platform section and said frame in response to an operator driving a vehicle onto or from said platform assembly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top plan view of a trailer incorporating a load supporting assembly of the present invention showing a platform subassembly of the load supporting assembly having a middle fixed platform section, front and rear pivotal platform sections pivotally mounted at opposite ends of the middle fixed platform section and dual actuation linkages movably interconnecting the front and rear pivotal platform sections.

FIG. 1A is an enlarged detailed view of a latching means of the load supporting assembly as seen along line 1A—1A of FIG. 1.

FIG. 2 is an enlarged longitudinal sectional view of the assembly taken along line 2—2 of FIG. 1 showing the front pivotal platform section in a raised position and the rear pivotal platform section in a lowered position.

FIG. 3 is the same view of the assembly as seen in FIG. 2 but showing the front pivotal platform section in a lowered position and the rear pivotal platform section in a raised position.

DETAILED DESCRIPTION OF THE INVENTION

Figure 4:
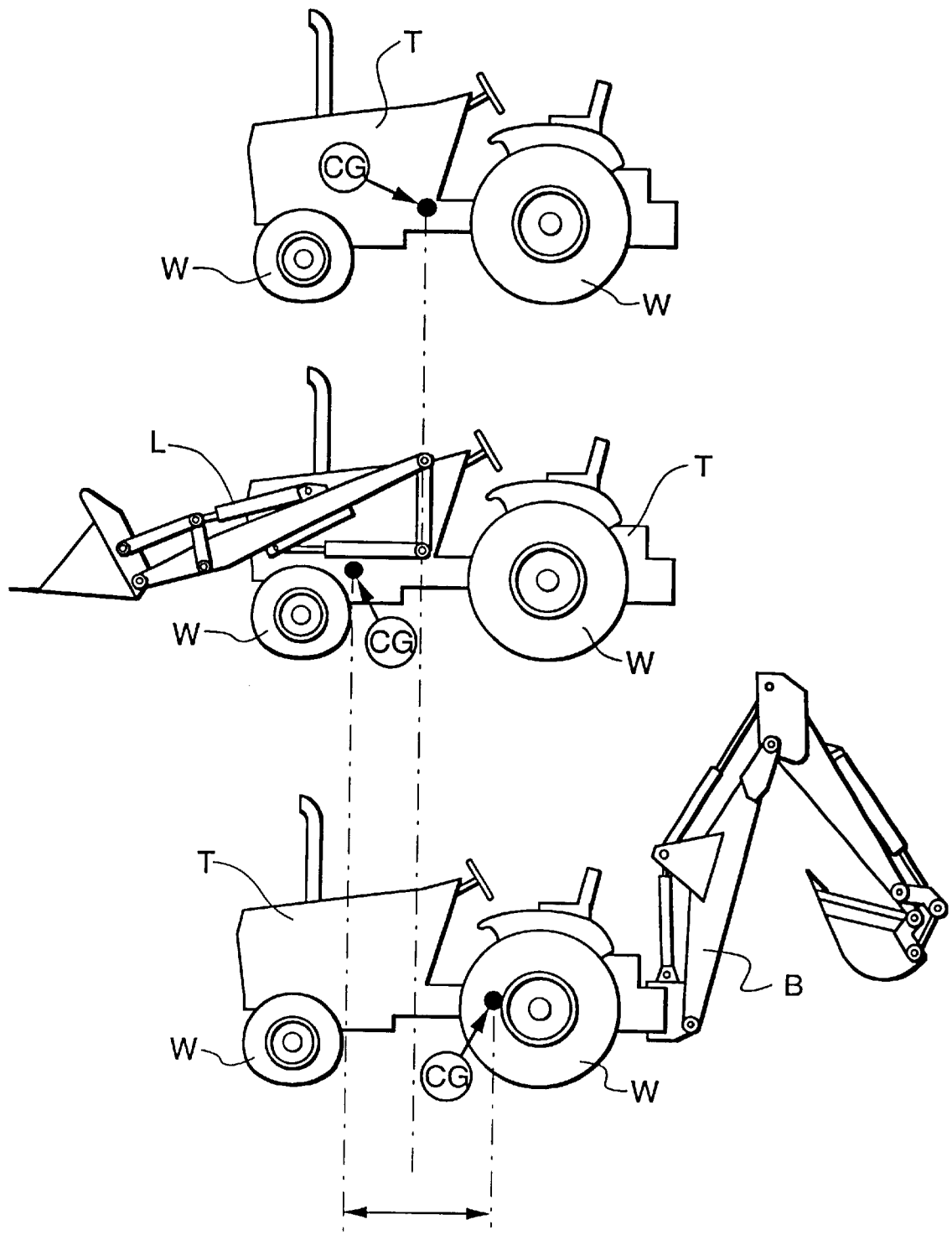
FIG. 4 is a side elevational view of a tractor showing different positions of a center of gravity CG of the tractor without an implement mounted thereon, with a front end loader implement mounted thereon and with a backhoe implement mounted thereon.

Referring to the drawings and particularly to FIGS. 1 to 3, there is illustrated a trailer, generally designated 10, incorporating a load supporting assembly, generally designated 12, of the present invention. The employment of the load supporting assembly 12 on the trailer 10 is a preferred embodiment; however, the assembly 12 could be employed on the bed of other vehicles, such as a truck. The load supporting assembly 12 basically includes an elongated frame 14, a platform subassembly 16 having a middle fixed platform section 18 and a pair of front and rear pivotal platform sections 20, 22 respectively pivotally mounted forwardly and rearwardly of the middle fixed platform section 16, and means in the form of a pair of elastic, or extensible and contractible, actuation linkages 24 movably interconnecting the front and rear pivotal platform sections 20, 22. Due to the resilient elasticity of the linkages 24, the front and rear pivotal platform sections 20, 22 can pivot independently of and automatically relative to one another and to the middle fixed platform section 18 and the elongated frame 14 without the need for any substantial operator intervention and only in response to an operator driving a vehicle, such as a tractor T or the like, from ground surface S onto the platform subassembly 16 or from the platform subassembly 16 onto the ground surface S, as shown in FIGS. 5 to 8, 11 and 12. During being loaded onto the platform subassembly 16, the tractor T can push the front pivotal platform section 20 from a raised position, as seen in FIG. 6, downward to a lowered position, as seen in FIG. 7, without any corresponding movement of the rear pivotal platform section 22. Conversely, during being unloaded from the platform subassembly 16, the tractor T can push the rear pivotal platform section 22 from a raised position, as seen in FIG. 8, downward to a lowered position, as seen in FIG. 7, without any corresponding movement of the front pivotal platform section 20.

The elongated frame 12 is part of a mobile chassis 26 of the trailer 10 which is supported by an axle 28 with wheels 30 rotatably mounted at the opposite ends 28A of the axle 28 for mobilizing the trailer for movement along the ground surface S. More particularly, the elongated frame 12 includes a pair of laterally spaced apart longitudinally extending frame members 32, a forward transverse frame member 34 extending between and rigidly interconnecting forward portions 32A of the longitudinal frame members 32 and a pair of longitudinally spaced middle transverse frame members 36A, 36B extending between and rigidly interconnecting middle portions 32B of the longitudinal frame members 32 and fixedly supporting the middle fixed platform section 18 of the platform subassembly 16 thereon. There is no transverse frame member on the frame 14 located rearwardly of the middle transverse frame member 36B. The longitudinal frame members 32 extend generally parallel to one another and the forward and rearward transverse frame members 34, 36A and 36B extend generally parallel to one another. In the illustrative embodiment, the forward one of the middle transverse frame members 36A is disposed at a higher elevation between the longitudinal frame members 32 than the rearward one of the middle transverse frame members 36B relative to the vertical height of the longitudinal frame members 32 such that the middle fixed platform section 18 is fixedly supported on the middle transverse frame members 36A, 36 at a desired fixed orientation to the frame 14 in which the middle fixed platform section 18 is at a slight acute angle relative to the longitudinal frame members 32 and a forward end 18A of the middle fixed platform section 18 is higher than a rearward end 18B thereof. However, it is to be understood that in keeping with the principles of the present invention, in other equivalent embodiments, the transverse frame members 36 A, 36B could be at the same elevation and thus the fixed middle platform section 18 would be flat relative to the longitudinal frame members 32. The mobile chassis 26 also has a V-shaped tongue 38 fixedly attached to and extending forwardly from the forward portions 32A of the longitudinal frame members 32 of the elongated frame 14. The tongue 26 has a clevis 40 disposed at a front end 26A thereof for pivotally attaching the mobile chassis 26 to a hitch of a towing vehicle (not shown).

Referring again to FIGS. 1 to 3, the front pivotal platform section 20 of the platform subassembly 16 preferably includes a pair of forward tracks 42 disposed between the longitudinal frame members 32 of the frame 14 and having opposite front and rear ends 42A, 42B and opposite outer and inner sides 42C, 42D. The forward tracks 42 at their respective outer sides 42C are spaced inwardly from the longitudinal frame members 32, extend longitudinally between their opposite front and rear ends 42A, 42B, and at their respective inner sides 42D are laterally spaced apart from one another. The forward tracks 42 are also disposed in substantially parallel relation to one another. Each forward track 42 has a substantially flat rectangular configuration, although it can have other configurations, and a top surface 42E of a width large enough to receive and guide thereover one or more of the wheels W of the tractor T during the loading and unloading of the tractor T onto and from the platform subassembly 16. The front pivotal platform section 20 also includes a forward cross member 44 having opposite ends 44A. The forward cross member 44 underlies, extends transversely to, and fixedly interconnects the front ends 42A of the forward tracks 42. The opposite ends 44A of the front cross member 44 preferably extend laterally beyond the outer sides 42C of the forward tracks 42 such that the opposite ends 44A are spaced above the respective forward portions 32A of the longitudinal frame members 32 when the front pivotal platform section 20 is at its raised position, as seen in FIG. 2, and the opposite ends 44A overlie and rest upon the forward portions 32A of the longitudinal frame members 32 when the front pivotal platform section 20 is at its lowered position, as seen in FIG. 3, such that said front pivotal platform section 20 in its lowered position lies in substantially the same inclined orientation as the fixed middle platform section 18 as shown in the illustrative embodiment. However, it is to be understood that in keeping with the principles of the present invention, the front cross member 44 may be shorter in its transverse length and thereby extend between the inner sides of the longitudinal frame members 32 and is not inclined as depicted in the illustrative figures of the preferred embodiment. In such alternate flat orientation of the front pivotal section 20, the front pivotal section 20 in its lowered position would rest on the forward transverse frame member 34 or another transverse frame member (not shown), extending between the longitudinal frame members 32, could be added to support the forward end of the front pivotal platform section 20 in its lowered position.

The rear pivotal platform section 22 of the platform subassembly 16 preferably includes a pair of rearward tracks 46 disposed between the longitudinal frame members 32 of the frame 14 and having opposite front and rear ends 46A, 46B and opposite outer and inner sides 46C, 46D. The rearward tracks 46 at their respective outer sides 46C are spaced inwardly from the longitudinal frame members 32, extend longitudinally between their opposite front and rear ends 46A, 46B, and at their respective inner sides 46D are laterally spaced apart from one another. The rearward tracks 46 are also disposed in substantially parallel relation to one another. Each rearward track 46 has a substantially flat rectangular configuration, although it can have other configurations, and a top surface 46E of a width large enough to receive and guide thereover one or more of the wheels W of the tractor T during the loading and unloading of the tractor T onto and from the platform subassembly 16. The rear pivotal platform section 22 also includes a rearward cross member 48 having opposite ends 48A. The rearward cross member 48 underlies, extends transversely to, and fixedly interconnects the rearward tracks 46 adjacent to the rear ends 46B thereof. The opposite ends 48A of the rearward cross member 48 extend laterally beyond the outer sides 46C of the rearward tracks 46 such that the opposite ends 48A are spaced below the respective rearward portions 32C of the longitudinal frame members 32 when the rear pivotal platform section 22 is at its lowered position, as seen in FIG. 2, and the opposite ends 48A underlie and rest against the rearward portions 32C of the longitudinal frame members 32 when the rear pivotal platform section 22 is at its raised position, as seen in FIG. 3. In like fashion to the front cross member 44 in association with the front pivotal platform section 20, the rearward cross member 48 associated with the rear pivotal platform section 22 may also be shorter in its transverse length such that the rearward transverse member 48 extends between the longitudinal frame members 32 and thus move up between the longitudinal frame members 32 when the rear pivotal platform section 22 is moved between its lowered and raised positions.

The middle fixed platform section 18 of the platform subassembly 16 preferably includes a pair of middle tracks 50 disposed between the longitudinal frame members 32 and fixed to the middle transverse frame members 36A and 36B of the frame 14. The middle tracks 50 have opposite front and rear ends 50A, 50B and opposite outer and inner sides 50C, 50D. The middle tracks 50 at their respective outer sides 50C are spaced inwardly from the longitudinal frame members 32, extend longitudinally between their opposite front and rear ends 50A, 50B, and at their respective inner sides 50D are laterally spaced apart from one another. The middle tracks 50 are also disposed in substantially parallel relation to one another. Each middle track 50 has a substantially flat rectangular configuration, although it can have other configurations, and a top surface 50E of a width large enough to receive and guide thereover one or more of the wheels W of the tractor T during the loading and unloading of the tractor T onto and from the platform subassembly 16.

Each middle track 50 is substantially similar to but shorter in length than respective ones of the forward tracks 42 of the front pivotal platform section 20 and of the rearward tracks 46 of the rear pivotal platform section 22. The middle fixed platform section 18 disposed in the fixed orientation on the frame 14 is always spaced above the ground surface S. The front pivotal platform section 20 is spaced above the ground when in both raised and lowered positions. The rear pivotal platform section 22 is spaced above the ground when in its raised position but contacts the ground when in its lowered position. Each rearward track 46 of the rear pivotal platform section 22 includes a ground engaging member 52 at its rear end 46B of a substantially triangular cross-sectional configuration so as to lie flush with the ground surface S when the rear pivotal platform section 22 is at its lowered position such that the rear pivotal platform section 22 can function as a ramp.

The forward tracks 42 of the front pivotal platform section 20 at their respective rear ends 42B are pivotally connected and mounted to the front ends 50A of the middle tracks 50 of the middle fixed platform section 18 by pairs of offset tabs 54 fixed on and projecting from the respective rear ends 42B and front ends 50A and by couplers 56 extending through aligned apertures (not shown) in the pairs of offset tabs 54. Similarly, the rearward tracks 46 of the rear pivotal platform section 22 at their respective front ends 46A are pivotally connected and mounted to the rear ends 50B of the middle tracks 50 of the middle fixed platform section 18 by pairs of offset tabs 58 fixed on and projecting from the respective front ends 46A and rear ends 50B and by couplers 60 extending through aligned apertures (not shown) of the pairs of offset tabs 58.

The elastic linkages 24 of the assembly 12 which movably interconnect the front and rear pivotal platform sections 20, 22 extend along the opposite outer sides 50C of the middle tracks 50 of the middle fixed platform section 18 of the platform subassembly 16 and are mounted along adjacent portions of the opposite outer sides 42C, 46C of the forward and rearward tracks 42, 46 of the front and rear pivotal platform sections 20, 22 of the platform subassembly 16. As mentioned earlier, the elastic linkages 24 allow independent pivotal movement of each of the front and rear pivotal platform sections 20, 22 of the platform subassembly 16 between their respective raised and lowered positions as shown in FIGS. 2 and 3. More particularly, each of the linkages 24 includes an elastic member 62 and forward and rearward brace structures 64, 66 supporting the elastic member 62 therebetween. The elastic member 62 is at least one and preferably a pair of extensible and contractible springs 68. The brace structures 64, 66 of the linkages 24 are respectively fixedly mounted on respective portions of the outer sides 42C, 46C of the aligned forward and rearward tracks 42, 46 adjacent to the opposite front and rear ends 50A, 50B of the middle tracks 50. The extendable and contractible springs 68 are arranged in pairs on each of the opposite outer sides 50C of the middle tracks 50 of the middle fixed platform section 18. Each of the pairs of springs 68 extend between and are attached by plates 70 to the upper ends 64A, 66A of the brace structures 64, 66 of the respective pairs thereof. The brace structures 64, 66 of a given pair thereof are spaced apart from and disposed in substantially parallel relation to one another. Each brace structure 64, 66 is formed by a pair of leg members 64B, 64C and 66B, 66C provided in upstanding orientations and substantially right triangular arrangement when viewed from a side thereof. As best seen in FIGS. 2 and 3, the linkages 24 and associated brace structures 64, 66 and plates 70 are so positioned and arranged so as to project upwardly above the axle 28; however, in keeping with the principles of the present invention, the linkages 24 and associated brace structures 64, 66 and plates 70 could be inverted to project downwardly toward the ground surface S in which case the springs 68 would be compression springs rather than expansion springs.

Figure 5:
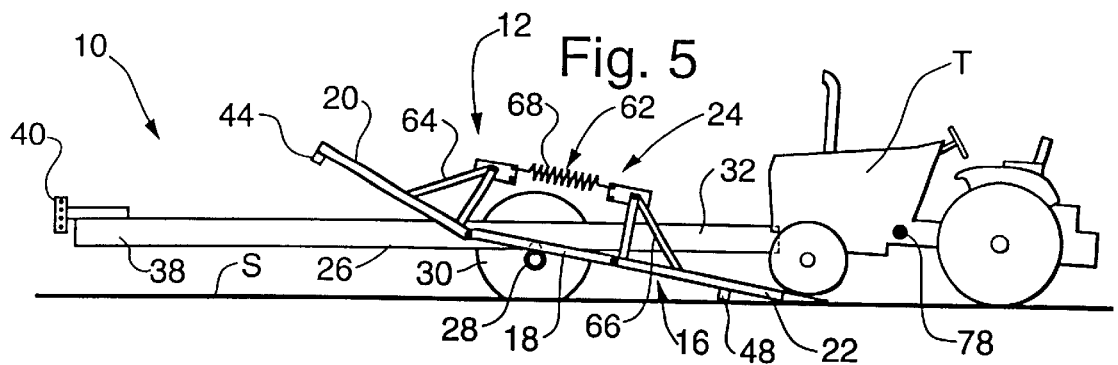
FIG. 5 is a side elevational view of the assembly similar to that of FIG. 2 but on a reduced scale and showing the tractor of FIG. 2 without any implement mounted thereon with only the front wheels of the tractor on the rear end of the rear pivotal platform section.
Figure 6:
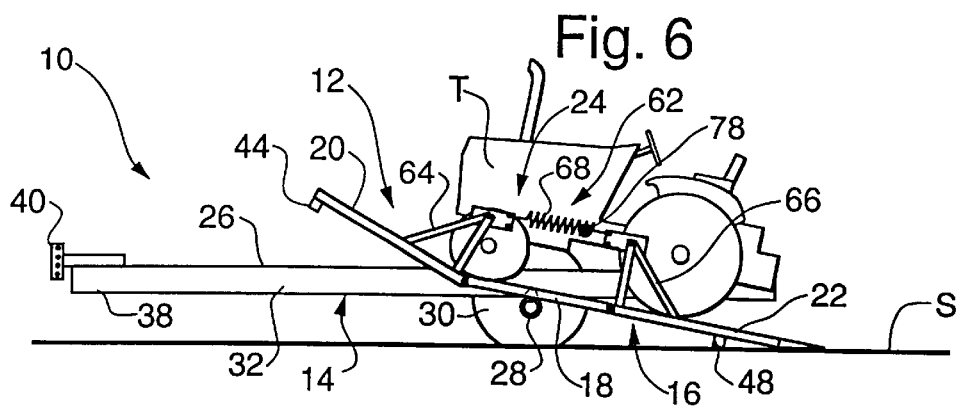
FIG. 6 is the same view of the assembly and the tractor as seen in FIG. 5 but showing the front wheels of the tractor on the forward end of the middle fixed platform section and the rear wheels of the tractor on the rear pivotal platform section.
Figure 7:
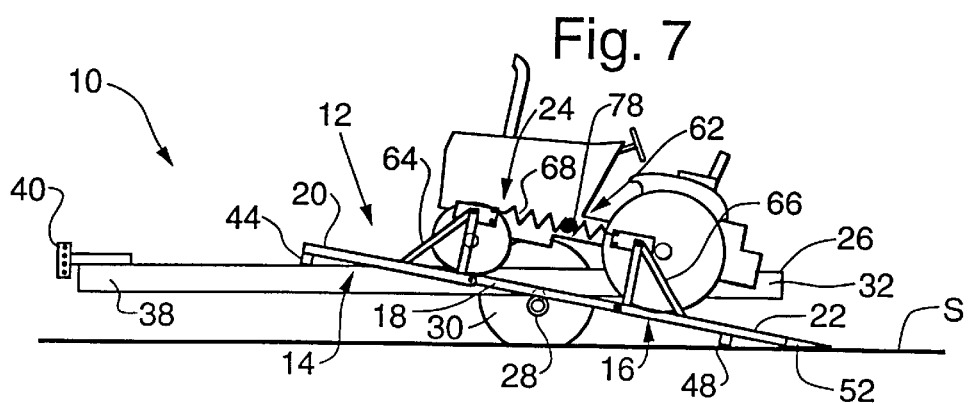
FIG. 7 is the same view of the assembly and the tractor as seen in FIG. 6 but showing the front wheels of the tractor on the rear end of the front pivotal platform section and the rear wheels of the tractor on the front end of the rear pivotal platform section.
Figure 8:
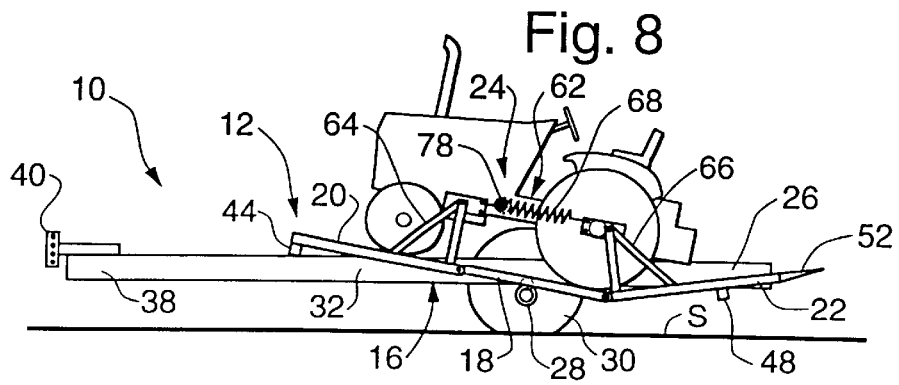
FIG. 8 is the same view of the assembly and the tractor as seen in FIG. 7 but showing the front wheels of the tractor on the middle of the front pivotal platform section and the rear wheels of the tractor on rear end of the middle fixed platform section.

Referring to FIGS. 2, 3 and 5 to 8, the front pivotal platform section 20 is shown in the raised position in FIGS. 2, 5 and 6 and in the lowered position in FIGS. 3, 7 and 8. Preferably, the front pivotal platform section 20 is inclined forwardly and at a steeper angle in the raised position than in the lowered position; however, in the lowered position the front pivotal platform section 20 maybe disposed in a generally horizontally flat orientation rather than at an inclined orientation (as shown) with a minor design modification as discussed earlier. Preferably, the rear pivotal platform section 22 is shown in the lowered position in FIGS. 2, 5, 6 and 7 and in the raised position in FIGS. 3 and 8. And preferably the rear pivotal platform section 22 is inclined forwardly in the lowered position and inclined rearwardly in the raised position. It should be noted that due to the inclined orientation of the middle fixed platform section 18 and its coplanar relationship with the rear platform section 22 in its lowered position, they together form a substantially continuous extended ramp at a low angle inclination relative to the ground surface S for facilitating the loading and unloading of a vehicle, such as the tractor T, onto and from the trailer 10. This low inclination of the substantially continuous extended ramp is especially beneficial in the loading of low clearance vehicles since they have a tendency to butt against the trailer bed during loading and unloading thereof onto and from a conventional trailer wherein the ramps onto the trailer bed are positioned at a large inclination angle whereby the transition point from the inclined ramp to the relatively flat trailer bed catches the frame or undercarriage of the low clearance vehicle. This low inclination of the substantially continuous extended ramp, without any substantial transition interruption, also enables lowfriction vehicles, such as pavement rollers which only have steel drums as rollers, to be loaded and unloaded onto and from the trailer T. Also, it should be noted that, when the front platform section 20 is in its lowered position, the fixed middle platform section 18 together with the front platform section 20 in its lowered position form a substantially continuous ramp for continual movement of the tractor T onto the trailer 10 without any substantial change of inclination. As used herein, a substantially continuous ramp not only includes coplanar members per se wherein the front pivotal platform section 20, the fixed middle platform section 18 and the rear pivotal platform section 22 all lie on the same plane, but also includes those arrangements wherein one or two of the platform sections 20, 18, 22 is inclined in the same orientation but at a different inclination angle relative to another one of the platform sections 20, 18, 22 in thereby forming an interruption between two adjacent platform sections 20, 18, 22 but with the interruption not constituting a large inclination angle whereby the transition point between the two adjacent platform sections 20, 18, 22 catches the frame or undercarriage of a low clearance vehicle to be loaded onto or unloaded from the platform subassembly 16. For example, a substantially continuous ramp would include the arrangement wherein one of the platform sections 20, 18, 22 is inclined, from rear to front, at a ten degree inclination relative to the ground surface S and another adjacent platform section 20, 18, 22 is inclined, from rear to front, at a five degree inclination relative to the ground surface S. As can been seen from this example, the two adjacent platform sections are inclined in the same orientation but at slightly different inclination angles in thereby forming a substantially continuous ramp having an interruption between the adjacent platform sections but wherein the interruption does not constitute an inclination angle sufficiently large so as to cause the undercarriage, of a vehicle to be loaded or unloaded, to catch on the platform subassembly 16.

Referring to FIGS. 5 to 8, the tractor T is loaded onto the platform subassembly 16 by initially moving the tractor T forwardly onto the rear pivotal platform section 22 while in its lowered position, as shown in FIG. 5, moving the tractor T farther forwardly on the rear pivotal platform section 22 and then onto the middle fixed platform section 18, as shown in FIG. 6, moving the tractor T still further forwardly so as to push the front pivotal platform section 20 down from its raised position to its lowered position and move the tractor T thereon without any corresponding movement of the rear pivotal platform section 22, as shown in FIG. 7, and finally moving the tractor T yet farther forwardly on the front pivotal platform section 20 and off the rear pivotal platform section 22 and allowing the rear pivotal platform section 22 to now move from its lowered position to raised position without any corresponding movement of the front pivotal platform section 20. The tractor T is unloaded by doing the aforementioned steps in reverse. The tractor T can be located longitudinally such that its center of gravity, generally designated CG, is just forwardly of the axle 28 of the trailer 10 or at any other desired position.

Referring now to FIGS. 1, 1A, 2 and 3, the assembly 10 also includes means, generally designated 72, for latching each of the front and rear pivotal platform sections 20, 22 to the frame 14 during transport movement of the trailer 10 or other vehicle incorporating the load support assembly 12. The latching means 72 includes a plurality of bars 74 and a plurality of clips 78, as shown particularly in FIG. 1A. Each bar 74 has a substantially T-shaped configuration and, in the illustrative embodiment, is made of a substantially stretchable but resilient material, such as rubber, but other suitable materials can be used. In the illustrated embodiment, each bar 74 is pivotally mounted at one end 74A to the exterior side of one of the forward and rearward portions 32A, 32C of the longitudinal frame members 32 of the frame 12 and each clip 78 is fixedly mounted to the respective opposite ends 44A, 48A of the forward and rearward cross members 44, 48 extending beyond the opposite outer sides 42C, 46C of the forward and rearward tracks 42, 46 of the front and rear pivotal platform sections 20, 22. The clips 78 have substantially U-shaped cross-sectional configurations such that each clip 78 can releasably and securely receive an opposite T-shaped end 74B of one of the bars 74 for latching the front and rear pivotal platform sections 20, 22 to the frame 12 when in their respective lowered and raised positions, as seen in FIG. 3. The latching means 72 thus prevents each of the front and rear pivotal platform sections 20, 22 of the platform subassembly 16 from bouncing during movement of the assembly 10, especially when the platform subassembly 16 is empty. It should be understood that the mounting locations of the bars 74 and clips 78 could be reversed. In addition to preventing bouncing of the platform subassembly 16 as described above, the latching means 72 also serves as a positive lock or interlock in placing the platform subassembly 16 in a rigid lock transport mode so as to ensure that neither the front pivotal platform section 20 nor the rear pivotal platform section 22 pivot either upwardly or downwardly while the loaded platform subassembly 16 is being towed down a highway. Although the latching means 72 in the illustrative embodiment has been shown in the form of bars 74 and clips 78, there are many other suitable latching structures (not shown), well known to those skilled in the art, for performing the function of the latching means 72. For example, the latching means 72 could be in the form of removable locking pins that could be inserted through corresponding aligned thru-holes provided in the longitudinal frame members 32 and the front and rear pivotal platform sections 20, 22.

Figure 9:
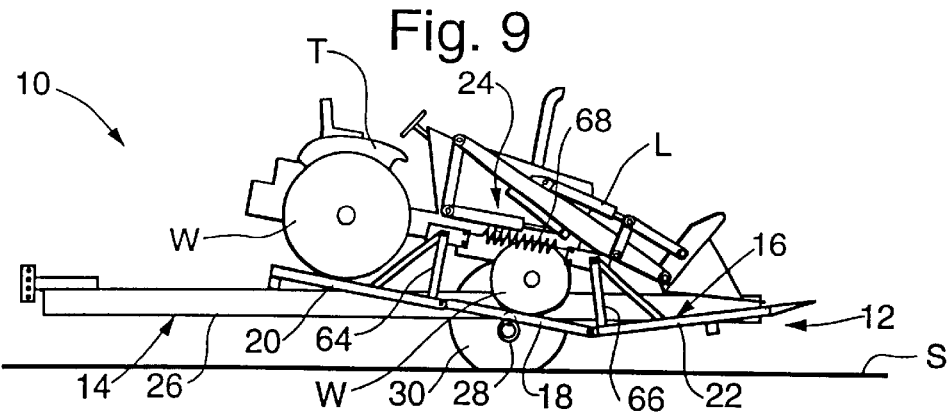
FIG. 9 is the same view of the assembly and the tractor as seen in FIG. 8 but showing the tractor facing rearwardly and with a front end loader implement mounted thereon.
Figure 10:
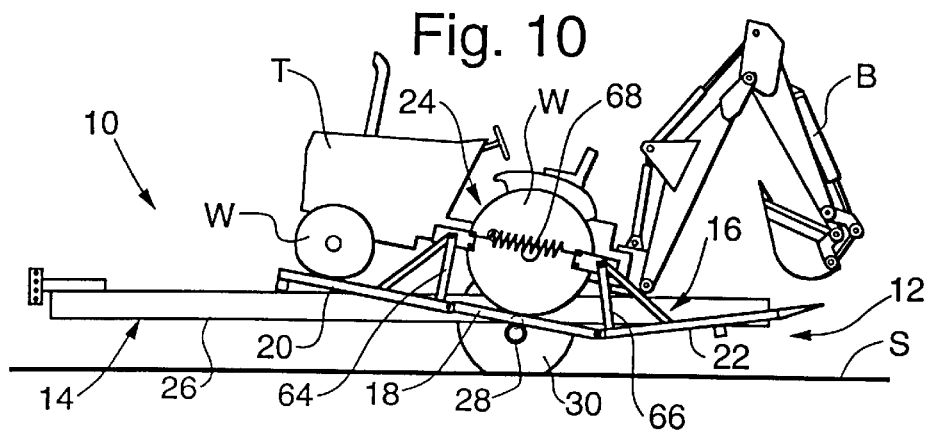
FIG. 10 is the same view of the assembly and the tractor as seen in FIG. 8 but showing the tractor facing forwardly and with a backhoe implement mounted thereon.
Figure 11:
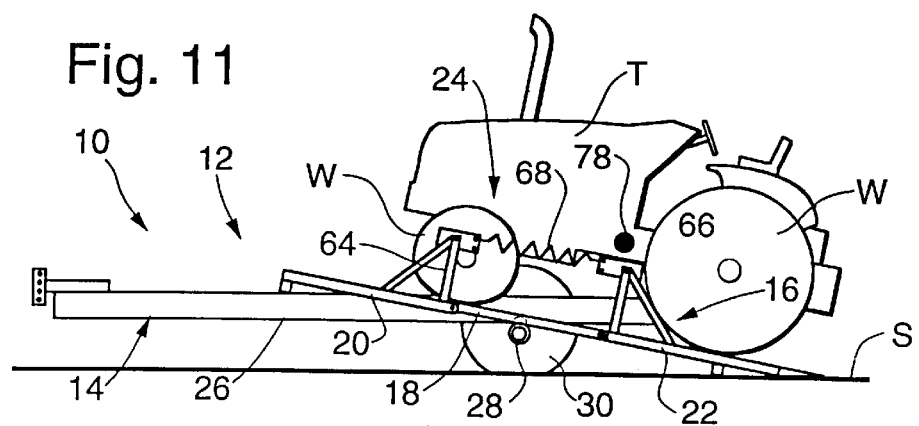
FIG. 11 is the same view of the assembly as seen in FIG. 7 but showing a tractor of larger size.
Figure 12:
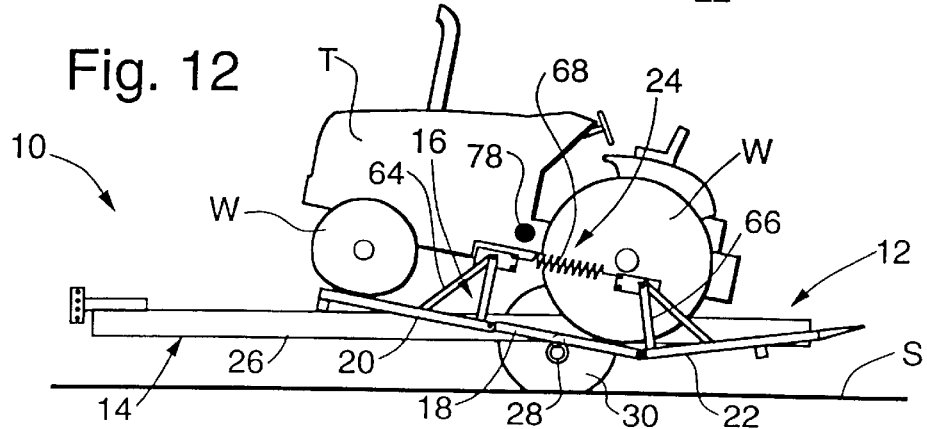
FIG. 12 is the same view of the assembly as seen in FIG. 8 but showing the tractor of larger size.

Referring now to FIGS. 4 and 9 to 12, the different locations of the center of gravity, as indicated by CG, of the tractor T are shown as solid black dots. In FIG. 4, the different locations of the center of gravity CG of the tractor T are shown without an implement mounted thereon, with a front end loader implement L mounted thereon and with a backhoe implement H mounted thereon The addition of the respective implement L, H causes the center of gravity CG to shift toward the end of the tractor where the implement is mounted. In FIGS. 9 and 10, tractors T with respective implements L, B mounted thereon and having different centers of gravity are shown facing rearwardly and forwardly and positioned so that their respective centers of gravity are at the desired locations along the platform subassembly 16. FIGS. 11 and 12 show a tractor T of larger size being loaded onto the platform subassembly 16. In FIG. 11, the front and rear wheels 30 of the tractor T are shown disposed at the same time on the front and rear pivotal platform sections 20, 22 causing them to be in their lowered positions at the same time. In FIG. 12, the wheels W of the tractor T have moved farther on the front section 20 and middle section 18 of the platform subassembly 16 and have moved off the rear section 22 of the platform subassembly so as to allow the rear section 20 to move from the lowered position to the raised position. The center of gravity CG of the large tractor T also can be located just forwardly of the axle 28 or at another desired locations on the platform subassembly 16 of the trailer 10.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A load supporting assembly, comprising:
   (a) an elongated frame;
   (b) a platform subassembly supported by said frame and including
      (i) a middle fixed platform section mounted to said frame at a fixed orientation and having opposite forward and rearward ends,
      (ii) a front pivotal platform section having a rear end pivotally mounted adjacent to said forward end of said middle fixed platform section to undergo pivotal movement between raised and lowered positions relative to said middle fixed platform section and said frame, and
      (iii) a rear pivotal platform section having a front end pivotally mounted adjacent to said rearward end of said middle fixed platform section to undergo movement between raised and lowered positions relative to said middle fixed platform section and said frame; and
   (c) means for movably interconnecting said front and rear pivotal platform sections such that said front and rear pivotal platform sections can pivot independently of and automatically relative to one another and to said middle fixed platform section and said frame in response to an operator driving a vehicle onto or from said platform assembly wherein the vehicle in being loaded onto said platform subassembly can push said front pivotal platform section down from said respective raised to lower position thereof without any corresponding movement of said rear pivotal platform section and the vehicle in being unloaded from said platform subassembly can push said rear pivotal platform section down from said respective raised to lower position thereof without any corresponding movement of said front pivotal platform section.

2. The assembly as recited in claim 1, wherein said front pivotal platform section includes:
   a pair of longitudinally-extending forward tracks laterally spaced apart from and disposed in substantially parallel relation to one another; and
   a forward cross member extending transversely to and fixedly interconnecting said forward tracks.

3. The assembly as recited in claim 2, wherein each of said forward tracks of said front pivotal platform section has a width adapted to receive thereover wheels of the vehicle during loading and unloading of the vehicle onto and from said platform subassembly.

4. The assembly as recited in claim 2, wherein said forward cross member is spaced above said frame when said front pivotal platform section is at said raised position and rests on and overlies said frame when said front pivotal platform section is at said lowered position.

5. The assembly as recited in claim 2, wherein said rear pivotal platform section includes:
   a pair of longitudinally-extending rearward tracks laterally spaced apart from and disposed in substantially parallel relation to one another; and
   a rearward cross member extending transversely to and fixedly interconnecting said rearward tracks.

6. The assembly as recited in claim 5, wherein each of said rearward tracks of said rear pivotal platform section has a width adapted to receive thereover the wheels of the vehicle during loading and unloading of the vehicle onto and from said platform subassembly.

7. The assembly as recited in claim 5, wherein said rearward cross member is spaced below said frame when said rear pivotal platform section is at said lowered position and rests against and underlies said frame when said rear pivotal platform section is at said raised position.

8. The assembly as recited in claim 5, wherein said middle fixed platform section includes a pair of longitudinally-extending middle tracks laterally spaced apart from and disposed in substantially parallel relation to one another and being fixed on said frame in longitudinal alignment with said forward and rearward tracks when viewed from thereabove.

9. The assembly as recited in claim 8, wherein each of said middle tracks of said middle fixed platform section has a width adapted to receive thereover wheels of the vehicle thereover during loading and unloading of the vehicle onto and from said platform subassembly.

10. The assembly as recited in claim 8, wherein:
   each of said forward tracks of said front pivotal platform sections has a rear end;
   each of said rearward tracks of said rear pivotal platform sections has a front end; and
   each of said middle tracks of said middle fixed platform section has opposite forward and rearward ends, said forward tracks at said rear ends thereof being pivotally coupled to said forward ends of said middle tracks, said rearward tracks at said front ends thereof being pivotally coupled to said rearward ends of said middle tracks.

11. The assembly as recited in claim 1, wherein said frame includes:
   a pair of laterally spaced apart longitudinally-extending frame members; and
   forward and rearward transverse frame members extending between and rigidly interconnecting said longitudinally-extending frame members and fixedly supporting said middle fixed platform section thereon at said fixed orientation.

12. The assembly as recited in claim 11, wherein said longitudinally-extending frame members each has a height and said transverse frame members are disposed at different elevations between said longitudinally-extending frame members relative to the heights thereof such that said fixed orientation of said middle fixed platform section is at a slight acute angle relative to said longitudinally-extending frame members of said frame.

13. The assembly as recited in claim 1, wherein said means for movably interconnecting said front and rear pivotal platform sections is a pair of extendable and contractible linkages.

14. The assembly as recited in claim 13, wherein each of said linkages includes:
   an elastic member having opposite ends; and
   a pair of brace structures each respectively fixedly mounted on one of said front and rear pivotal platform sections, each of said elastic members extending between and being coupled at said opposite ends thereof to said brace structures of a respective pair thereof for allowing independent pivotal movement of each of said front and rear pivotal platform sections relative to one another and to said frame.

15. The assembly as recited in claim 14, wherein said middle fixed platform section has a pair of opposite sides and each of said elastic members extends along and is spaced vertically from one of said opposite sides of said middle fixed platform section.

16. The assembly as recited in claim 14, wherein each of said elastic members is at least one extensible and contractible spring.

17. The assembly as recited in claim 1, further comprising:
   means for latching each of said front and rear pivotal platform sections to said frame during movement of said load supporting assembly.

18. The assembly as recited in claim 17, wherein:
   each of said front and rear pivotal platform sections has opposite sides disposed adjacent to said frame when said front pivotal platform section is at said lowered position thereof and said rear pivotal platform section is at said raised position thereof; and
   said latching means includes
   a plurality of bars each having a substantially T-shaped configuration and being pivotally mounted to one of said frame and said opposite sides of said front and rear pivotal platform sections, and
   a plurality of clips each having a substantially U-shaped cross-sectional configuration and being fixedly mounted to the other of said frame and said opposite sides of said front and rear pivotal platform sections such that each of said clips releasably and securely receives one of said bars for latching said front and rear pivotal platform sections to said frame.

19. A load supporting assembly, comprising:

(a) an elongated frame;

(b) a platform subassembly supported by said frame and including
   (i) a middle fixed platform section mounted to said frame at a fixed orientation and having opposite forward and rearward ends spaced apart at a first longitudinal length,
   (ii) a front pivotal platform section having front and rear ends spaced apart at a second longitudinal length being greater than said first longitudinal length of said middle fixed platform section, said front pivotal platform section being pivotally coupled at said rear end thereof to said forward end of said middle fixed platform section to undergo pivotal movement between raised and lowered positions relative to said middle fixed platform section and said frame, and
   (iii) a rear pivotal platform section having front and rear ends spaced apart at a third longitudinal length being greater than said first longitudinal length of said middle fixed platform section, said rear pivotal platform section being pivotally coupled at said front end thereof to said rearward end of said middle fixed platform section to undergo movement between raised and lowered positions relative to said middle fixed platform section and said frame; and (c) means for movably interconnecting said front and rear pivotal platform sections such that said front and rear pivotal platform sections can pivot relative to said middle fixed platform section and said frame in response to an operator driving a vehicle onto or from said platform assembly.

20. The assembly as recited in claim 19, wherein said means for movably interconnecting said front and rear pivotal platform sections of said platform subassembly is a pair of extendable and contractible linkages.

21. The assembly as recited in claim 19, wherein
said elongated frame includes a pair of laterally spaced apart longitudinally-extending frame members; and
said middle fixed platform section having opposite forward and rearward ends and is mounted to said frame at an inclined orientation relative to said longitudinally-extending frame members with said forward end being disposed at an elevation greater than said rearward end.

22. A load supporting assembly, comprising:

(a) an elongated frame including a pair of laterally spaced apart longitudinally-extending frame members;

(b) a platform subassembly supported by said frame and including
   (i) a middle fixed platform section mounted to said frame at an inclined orientation relative to said longitudinally-extending frame members and having opposite forward and rearward ends with said forward end being disposed at an elevation greater than said rearward end,
   (ii) a front pivotal platform section having front and rear ends, said front pivotal platform section at said rear end thereof being pivotally mounted adjacent to said forward end of said middle fixed platform section to undergo pivotal movement between raised and lowered positions relative to said middle fixed platform section and said frame, and
   (iii) a rear pivotal platform section having front and rear ends, said rear pivotal platform section at said front end thereof being pivotally mounted adjacent to said rearward end of said middle fixed platform section to undergo movement between raised and lowered positions relative to said middle fixed platform section and said frame, said rear pivotal platform section in said lowered position and said middle fixed platform section together forming an extended substantially continuous ramp at a low angle inclination relative to the ground for facilitating the loading and unloading a vehicle onto and from said platform assembly; and (c) means for movably interconnecting said front and rear pivotal platform sections such that said front and rear pivotal platform sections can pivot relative to said middle fixed platform section and said frame in response to an operator driving a vehicle onto or from said platform assembly.

23. The assembly as recited in claim 22, wherein said rear pivotal platform section in said raised position is oppositely inclined relative to said inclined orientation of said middle platform section.

24. The assembly as recited in claim 22, wherein said front pivotal platform section in said lowered position and said middle fixed platform section together forming an extended continuous ramp at a low angle inclination relative to the ground for facilitating the loading and unloading a vehicle onto and from said platform assembly.

25. The assembly as recited in claim 22, wherein said front pivotal section in said lowered position and said middle fixed section are inclined in the same orientation.

* * * * *